(12) United States Patent
Lewis

(10) Patent No.: US 7,477,922 B2
(45) Date of Patent: Jan. 13, 2009

(54) HANDS-FREE KIT FOR MOBILE RADIO-TELEPHONE HANDSET

(75) Inventor: Marcus Lewis, Cardiff (GB)

(73) Assignee: We Thought of it 1st Limited, Cardiff (GB)

( * ) Notice: Subject to any disclaimer, the term of this patent is extended or adjusted under 35 U.S.C. 154(b) by 124 days.

(21) Appl. No.: 10/363,476

(22) PCT Filed: Aug. 31, 2001

(86) PCT No.: PCT/GB01/03917

§ 371 (c)(1),
(2), (4) Date: Mar. 7, 2003

(87) PCT Pub. No.: WO02/19669

PCT Pub. Date: Mar. 7, 2002

(65) Prior Publication Data

US 2004/0033820 A1 Feb. 19, 2004

(30) Foreign Application Priority Data

Aug. 31, 2000 (GB) .................................. 0021238.1
Feb. 12, 2001 (GB) .................................. 0103359.6

(51) Int. Cl.
*H04M 1/00* (2006.01)

(52) U.S. Cl. .............. 455/569.1; 455/569.2; 455/575.2; 455/575.9; 455/41.2; 455/90.3; 379/430

(58) Field of Classification Search ... 455/569.1–569.2, 455/575.1–575.2, 575.9, 573, 41.1–41.2, 455/90.3; 379/433.01, 430; 381/110
See application file for complete search history.

(56) References Cited

U.S. PATENT DOCUMENTS

| 3,492,582 | A | * | 1/1970 | Heywood | ............... 340/323 R |
| 4,241,236 | A | * | 12/1980 | Nash | ........................ 379/56.3 |
| 4,490,012 | A | * | 12/1984 | Magiske | ..................... 248/476 |
| 4,669,108 | A | * | 5/1987 | Deinzer | ...................... 455/416 |
| 4,757,553 | A | * | 7/1988 | Crimmins | ................... 398/129 |

(Continued)

FOREIGN PATENT DOCUMENTS

CN 1191060 A 8/1998

(Continued)

*Primary Examiner*—Sharad Rampuria
(74) *Attorney, Agent, or Firm*—Andrus, Sceales, Starke & Sawall, LLP

(57) ABSTRACT

A hands-free kit for a mobile radio-telephone handset, the hands-free kit having an earpiece and an infra-red transmitter with the transmitter being able to relay audio signals from the handset to the earpiece. The earpiece includes an infra-red receiver for receiving audio signals from the transmitter. By positioning the transmitter in the line of sight of the earpiece receiver, audio signals may be relayed from the handset to the earpiece with the reduced likelihood of the earpiece becoming dislodged as the user moves his head.

65 Claims, 16 Drawing Sheets

U.S. PATENT DOCUMENTS

| | | | | |
|---|---|---|---|---|
| 4,905,270 A | * | 2/1990 | Ono | 455/569.2 |
| 5,048,077 A | * | 9/1991 | Wells et al. | 379/93.17 |
| 5,105,475 A | * | 4/1992 | Lynd et al. | 2/10 |
| 5,479,486 A | * | 12/1995 | Saji | 455/573 |
| 5,553,312 A | * | 9/1996 | Gattey et al. | 455/11.1 |
| 5,566,224 A | * | 10/1996 | ul Azam et al. | 455/566 |
| 5,590,417 A | | 12/1996 | Rydbeck | 455/89 |
| 5,608,794 A | * | 3/1997 | Larson | 379/396 |
| 5,634,201 A | * | 5/1997 | Mooring | 455/575.2 |
| 5,659,594 A | * | 8/1997 | Toda | 455/550.1 |
| 5,721,783 A | * | 2/1998 | Anderson | 381/328 |
| 5,768,397 A | | 6/1998 | Fazio | 381/68 |
| 5,771,438 A | * | 6/1998 | Palermo et al. | 455/41.1 |
| 5,794,163 A | * | 8/1998 | Paterson et al. | 455/575.2 |
| 5,881,149 A | | 3/1999 | Weatherill | 379/433 |
| 5,890,074 A | * | 3/1999 | Rydbeck et al. | 455/558 |
| 5,943,627 A | * | 8/1999 | Kim et al. | 455/569.1 |
| 5,966,643 A | | 10/1999 | Radley | 455/74.1 |
| 5,978,689 A | * | 11/1999 | Tuoriniemi et al. | 455/569.1 |
| 6,073,031 A | * | 6/2000 | Helstab et al. | 455/557 |
| 6,115,846 A | * | 9/2000 | Truesdale | 2/209.13 |
| 6,130,953 A | * | 10/2000 | Wilton et al. | 381/375 |
| 6,144,864 A | * | 11/2000 | Lands et al. | 455/569.1 |
| 6,154,663 A | * | 11/2000 | Itamochi | 455/569.2 |
| 6,230,029 B1 | | 5/2001 | Hahn et al. | 455/575.2 |
| 6,272,359 B1 | * | 8/2001 | Kivela et al. | 455/567 |
| 6,325,507 B1 | | 12/2001 | Jannard et al. | |
| 6,360,104 B1 | * | 3/2002 | Budd et al. | 455/566 |
| 6,366,672 B1 | * | 4/2002 | Tsay | 379/446 |
| 6,374,126 B1 | * | 4/2002 | MacDonald et al. | 455/569.1 |
| 6,397,086 B1 | * | 5/2002 | Chen | 455/569.2 |
| 6,421,426 B1 | * | 7/2002 | Lucey | 379/56.3 |
| 6,424,823 B1 | * | 7/2002 | Moles | 455/90.1 |
| 6,459,882 B1 | * | 10/2002 | Palermo et al. | 455/41.1 |
| 6,473,630 B1 | * | 10/2002 | Baranowski et al. | 455/572 |
| 6,526,293 B1 | * | 2/2003 | Matsuo | 455/573 |
| 6,542,758 B1 | * | 4/2003 | Chennakeshu et al. | 455/569.2 |
| 6,625,476 B1 | * | 9/2003 | Perng | 455/569.1 |
| 6,697,638 B1 | * | 2/2004 | Larsson et al. | 455/553.1 |
| 6,738,485 B1 | * | 5/2004 | Boesen | 381/312 |
| 6,792,295 B1 | * | 9/2004 | Hanevich et al. | 455/569.1 |
| 6,850,776 B1 | * | 2/2005 | Sandelius et al. | 455/557 |
| 6,889,064 B2 | * | 5/2005 | Baratono et al. | 455/569.2 |
| 6,895,261 B1 | * | 5/2005 | Palamides | 455/575.6 |
| 6,947,764 B2 | * | 9/2005 | Carillo et al. | 455/550.1 |
| 6,950,681 B2 | * | 9/2005 | Hofmann | 455/569.1 |
| 7,095,981 B1 | * | 8/2006 | Voroba et al. | 455/41.2 |
| 7,255,437 B2 | | 8/2007 | Howell et al. | |
| 7,257,426 B1 | * | 8/2007 | Witkowski et al. | 455/569.2 |
| 7,297,128 B2 | | 11/2007 | Binder et al. | |

FOREIGN PATENT DOCUMENTS

| | | | |
|---|---|---|---|
| DE | 38 26 294 A1 | | 2/1990 |
| DE | 296 12 622 U1 | | 1/1998 |
| DE | 100 24 041 A1 | | 12/2000 |
| DE | 199 42 236 A1 | | 3/2001 |
| EP | 0840465 A2 | | 10/1997 |
| EP | 0868064 A1 | | 9/1998 |
| GB | 2347817 A | | 9/2000 |
| JP | 02309849 A | * | 12/1990 |
| JP | 11-308326 | | 11/1999 |
| WO | WO 99/43136 | | 8/1999 |
| WO | WO 00/72463 A2 | | 11/2000 |
| WO | WO 01/29979 A1 | | 4/2001 |

* cited by examiner

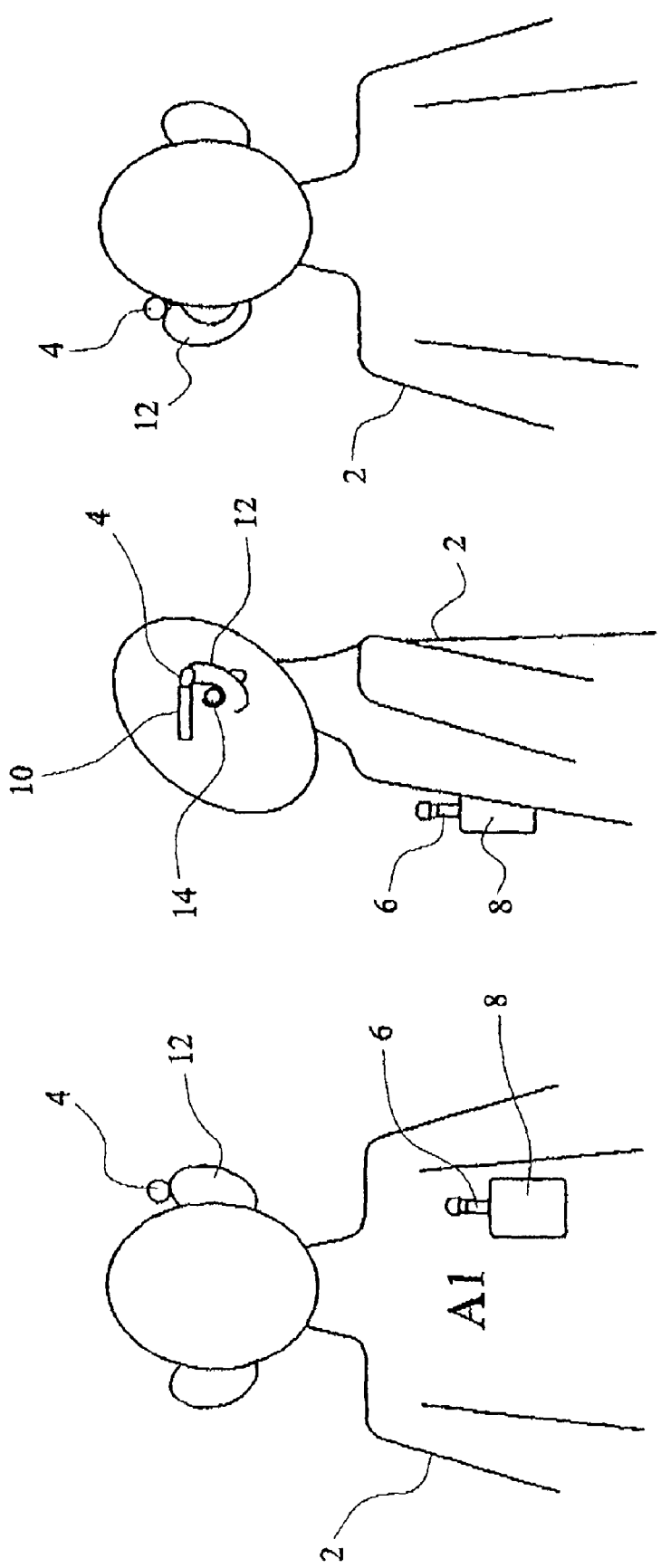

HANDS-FREE KIT FOR MOBILE RADIO-TELEPHONE HANDSET

BACKGROUND OF THE INVENTION

1. Technical Field of the Invention

The present invention relates to a hands-free kit for a mobile radio-telephone handset.

2. Description of the Prior Art

Concerns have recently grown over the safety of mobile radio-telephones handsets, otherwise known as cellular phones, which have been found to emit high levels of microwave radiation.

To reduce the risks associated with such handsets, a number of hands-free kits have been devised which connect an earpiece and microphone to a handset via wires, thereby allowing the handset to be located a safe distance from the user's head.

However, it has been found that the earpieces of such kits are easily dislodged by tension on the connecting wires caused, for example, by the wires catching on the user's outer garments as he moves his head.

More importantly, it has recently been suggested that the connecting wires of such kits act as a conduit, channelling microwave radiation from the handset to the user's head.

SUMMARY OF THE INVENTION

We have now devised an arrangement which overcomes the limitations of existing hand-free kits for mobile radio-telephone handsets.

According to a first aspect of the present invention, there is provided a hands-tree kit for a mobile radio-telephone handset, the kit comprising an earpiece and an infra-red transmitter, the transmitter being arranged to relay audio signals from the handset to the earpiece, the earpiece comprising an infra-red receiver for receiving audio signals from the transmitter.

Thus, by positioning the transmitter in line of sight of the receiver, audio signals may be relayed from the handset to the earpiece with the reduced likelihood of the earpiece becoming dislodged as the user moves his head.

The transmitter may communicate with the handset via a wired or wireless connection, such as a radio frequency connection provided by Bluetooth® or Bluetooth®-type communications devices.

The receiver may be located at the distal end of a portion of the earpiece which, in use, projects forwards from the user's ear.

Preferably the receiver comprises a plurality of photosensitive devices arranged to receive infra-red signals from different respective directions including the direction of the transmitter.

Alternatively, the earpiece may comprise means, provided on a forwards projecting portion of the earpiece, for reflecting audio signals from at least the direction of the transmitter towards the receiver.

The transmitter is preferably arranged to be carried in the user's breast pocket or worn on the user's front, in line-of-sight of the earpiece receiver or of the reflecting means, and may be provided with means for attaching to an outer-garment worn by the user. For example, the attaching means may comprise a clip or pin for attaching the transmitter to the breast pocket or the lapel of a jacket or to a neck-tie.

Alternatively the transmitter may be permanently mounted to, or provided with means for temporarily attaching to, a part of a vehicle, for example the vehicle dashboard or a seatbelt, in line-of-sight of the earpiece receiver.

Preferably, the hands-free kit also comprises a microphone for connecting to the handset, the microphone preferably comprising part of an integrated unit also comprising the transmitter.

Where the transmitter communicates with the handset via a wireless connection, the microphone preferably also communicates with the handset via the same wireless connection.

The transmitter may be powered from the power supply of the handset or may comprise its own re-chargeable porter supply.

The earpiece preferably comprises a re-chargeable power supply, which may be arranged to be re-charged via a mains adapter or by plugging the earpiece, either directly or via an adaptor, into the cigarette lighter socket of a vehicle.

Most preferably the kit comprises a holder for the earpiece and the transmitter via which respective re-chargeable power supplies of the two devices may be charged.

The holder may be arranged to charge the earpiece and transmitter either directly from an external supply or via its own re-chargeable supply, to enable the earpiece and transmitter to be charged in the absence of said external supply.

Typically, from a full state of charge, the power supply of the transmitter will be exhausted sooner than that of the earpiece. To ensure that the transmitter is charged for at least as long as the earpiece, the holder is preferably arranged prevent the earpiece from being charged independently of the transmitter. For example, an electrically conductive part of the transmitter may be arranged to bridge a pair of contacts of the holder to complete a charging circuit for the earpiece. Thus, both the transmitter and the earpiece must be fitted to the holder before the latter can be charged.

The holder may also or otherwise be arranged to prevent the transmitter from being charged independently of the earpiece.

The holder may be provided with means for visibly indicating its state of charge and/or the state of charge of the transmitter and/or of the earpiece. However, the transmitter and the earpiece preferably comprise independent means for visibly indicating their respective states of charge, the holder preferably comprising a lidded case having a portion which is at least partially transparent and through which the charge indicating means of the transmitter and earpiece may be viewed.

In either case, the indicating means preferably comprise respective lights, e.g. light emitting diodes, which may, for example, be constantly illuminated, extinguished or illuminated intermittently to indicate different states of charge.

Most preferably the transmitter and earpiece each comprise a respective light which is illuminated intermittently when the device is operating (to indicate that the device is charged), is constantly illuminated when the device is being charged and is extinguished when the device has exhausted its power supply.

Preferably the earpiece emits an audible warning signal to indicate when the power supply of the transmitter and/or the earpiece is nearing exhaustion. Preferably the earpiece emits a periodic audible signal, with the frequency of the emitted signal increasing as the power supply of the earpiece and/or the transmitter is exhausted. For example, the earpiece may emit an audible signal every 5 minutes when there is between 5 and 30 minutes of charge remaining in the transmitter and/or the receiver, every 1 minute when between 30 seconds and 5 minutes of charge remains and every second when less that 1 second of charge remains.

Signals transmitted from the transmitter to the receiver may be encrypted.

The transmitter and receiver may be arranged to respectively encode and decode signals using a unique encryption algorithm.

Alternatively, the transmitter and receiver may be arranged to respectively encode and decode signals using one of a plurality of encryption algorithms chosen on a random basis, the number of possible encryption algorithms being sufficient to ensure an acceptably low likelihood of the same encryption algorithm being used by two transmitter/receiver pairs in the same vicinity.

In either case, the transmitter and receiver may be pre-programmed with an appropriate encryption key. However, the encryption key is preferably transmitted from the transmitter to the receiver, having preferably been generated by the transmitter.

Where the encryption key is generated by the transmitter, the encryption algorithm may, for example, be derived from the phone number or other identification code of the handset with which the hands-free kit is to be used, or a new key, chosen at random, may be transmitted to the receiver on a periodic basis, for example each time the transmitter is charged.

The transmitter may also or otherwise be arranged to transmit an identification signal to identify itself to the earpiece.

The identification signal may be unique or may be chosen at random from one of a plurality of possible signals, the number of possible signals being sufficient to ensure an acceptably low likelihood of the same identification signal being used by two transmitter/receiver pairs in the same vicinity.

In either case, the transmitter and receiver may be pre-programmed to operate using a particular identification signal. However, the identification signal to be used is preferably communicated from the transmitter to the receiver, having preferably been generated internally by the transmitter.

Where the identification signal to be used is generated by the transmitter, the signal may, for example, be derived from the phone number or other identification code of the handset with which the hands-free kit is to be used, or a new signal, chosen at random, may be communicated to the earpiece on a periodic basis, for example each time the transmitter is charged.

The earpiece may be arranged to respond to an invalid identification signal by emitting an audible warning signal.

The transmitter is preferably arranged to periodically transmit said identification signal.

The earpiece may be arranged to provide an audible alarm signal it a valid identification signal is not received over a pre-determined period of time.

Most preferably, the earpiece is arranged to operate for periods in a standby mode, wherein one or more functions of the earpiece are disabled to conserve power, the earpiece preferably being arranged to enter the standby mode in the absence of a received signal or if a valid identification signal is not received. The or each disabled function is preferably restored in response to a received signal, preferably only if that signal comprises a valid identification signal.

Entry into the standby mode may be immediate or may be delayed in one or more of the above circumstances.

For example, the earpiece may be arranged to enter a standby mode in the absence of a received signal or if a valid identification signal (such as one transmitted periodically by the transmitter) is not received over a pre-determined period of time. Preferably, the earpiece will then return to full functionality only on receiving a valid identification signal.

The transmitter is preferably arranged to operate for periods in a standby mode, wherein one or more functions of the transmitter are disabled to conserve power, in the absence of an audio signal from the handset.

We have found that, in use, the amount of infra-red light received by the earpiece receiver from the transmitter varies as a user moves his head. We have also found that a high level of ambient light can corrupt the infra-red signals received by the earpiece.

To counteract these effects, the hands-free kit may be arranged to transmit infra-red light of a constantly high level of intensity, such that the receiver is certain to receive the infra-red light emitted by the transmitter over a range of orientations of the user's head and over a range of ambient light levels.

However, such an arrangement in clearly wasteful of the limited amount of power available to the transmitter as, except in a few extreme conditions, only a low intensity of infra-red light need be emitted by the transmitter.

To reduce the level of power consumption of the transmitter, whilst ensuring that an adequate signal is always received by the earpiece receiver, the hands-free kit therefore preferably comprises a second infra-red receiver, located adjacent the transmitter, and means for varying the intensity of the infra-red light emitted by the transmitter according the amount of infra-red light received by the second receiver.

The earpiece preferably comprises means for reflecting a portion of the infra-red light emitted by the transmitter back towards the second receiver.

The reflecting means preferably comprise a part-spherical, multi-faceted arrangement of mirrors, which is preferably located at the distal end of the forward projecting portion of the earpiece. Each facet preferably comprises a respective concave parabolic mirror.

An alternative means for optimising the amount of light received by the earpiece from the transmitter in accordance with the present invention, is to provide a set-up mode, wherein the transmitter emits a light signal of substantially constant amplitude and the earpiece emits a periodic audible signal, whose periodicity varies in accordance with the amount of light received from the transmitter as the position of the transmitter is adjusted by a user, for example by increasing in frequency with the amount of light received from the transmitter.

According to a second aspect of the present invention, there is provided a mobile radio-telephone arrangement comprising an earpiece and a mobile radio-telephone handset comprising an infra-red transmitter for relaying audio signals from the handset to the earpiece, the earpiece comprising an infra-red receiver for receiving audio signals from the transmitter.

According to a third aspect of the present invention, there is provided a mobile radio-telephone arrangement comprising a mobile radio-telephone handset and a hands-free kit comprising an infrared transmitter located at the breast of a user for relaying incoming audio signals from the handset to an earpiece worn by the user, the earpiece comprising an infra-red receiver for receiving audio signals from the transmitter According to a fourth aspect of the present invention, there is provided an earpiece for attaching to an ear of a user and comprising an infra-red receiver.

Preferably the receiver is arranged to receive signals from an infra-red transmitter positioned at the breast of a person wearing the earpiece.

A preferred embodiment of earpiece comprises a tail portion for hooking around the ear of the wearer, a portion which extends over and forwards from the user's ear and a portion which extends rearwards from the front of the device to position a microphone over the external auditory canal of the wearer.

Preferably an elastomeric grip is fitted to the tail portion of the earpiece, which is preferably replaceable to allow the shape of the device to be readily modified to fit different sized and shaped ears and the device to be personalised to the wearer's taste by replacing the grip with one of a different colour.

Preferably the front of the earpiece is provided with a window, behind which a pair of photosensitive devices are arranged to receive infra-red signals from different respective directions.

Preferably the tail portion of the earpiece houses electronic circuitry and a rechargeable power supply.

Preferably the microphone is rotatable about the axis of the rearwardly projecting portion, to enable the earpiece to be configured for fitting to either the left or the right ear of the wearer.

Preferably abutting parts of the rearwardly projecting portion and a housing of the microphone ensure that the microphone can only be rotated through 180 degrees between its left and right handed orientations.

According to a fifth aspect of the present invention, there is provided an audio apparatus comprising a headset, an infra-red transmitter for transmitting audio signals to the headset, an infra-red receiver located adjacent the transmitter and means for varying the intensity of the infra-red light emitted by the transmitter according to the amount of infra-red light received by the receiver.

Preferably the headset comprises means for reflecting a portion of the infra-red light emitted by the transmitter towards the receiver.

BRIEF DESCRIPTION OF THE DRAWING FIGURES

Embodiments of the present invention will now be described by way of examples only and with reference to the accompanying drawings, in which:

FIGS. 1 to 3 are respectively a front view, a side view and a rear view of a person wearing an apparatus in accordance with the present invention;

DETAILED DESCRIPTION OF THE DRAWING FIGURE AND PREFERRED EMBODIMENTS

Figure 4:
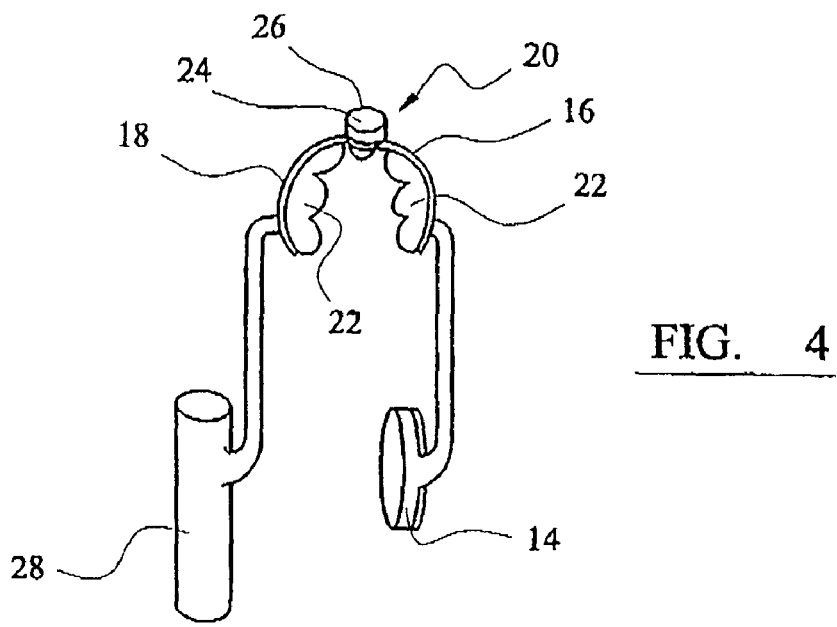
FIGS. 4 to 6 are respectively a front view, and perspective views from each side of a first embodiment of earpiece in accordance with the present invention.

Referring to FIGS. 1 to 3 of the drawings, a person 2 is shown wearing a hands-free kit in accordance with the present invention.

The hands-free kit comprises an earpiece 4 and a transmitter unit 6, clipped to the breast pocket 8 of the person's jacket, for relaying audio signals from a mobile radio telephone-handset (not shown), via an infra-red transmitter of the unit, to an infra-red receiver 10 of the earpiece 4.

The transmitter unit 6 also comprises a microphone, with audio signals being transmitted from the handset to the infra-red transmitter of the unit and from the microphone to the handset, via either a wired or a wireless link, so that the handset may be located a safe distance from the user's head.

The earpiece 4 is arranged to become activated upon receiving an audio signal from the transmitter unit 6, it preceded by a valid identification code, to provide an audible output of the audio signal via a speaker 14 adjacent the user's ear 12.

The transmitter unit 6 is arranged to periodically retransmit the identity code within an audio stream, the earpiece 4 being arranged entering a standby mode, to conserve power, in the absence of a received signal or where a valid identity code is not received within a period of time.

The transmitter unit 6 is also arranged to enter a standby mode, to conserve power, in the absence of a signal from the handset.

The transmitter unit 6 and earpiece 4 are powered by respective rechargeable supplies and are re-charged by fitting the two parts to a holder, such as that described in detail below. As the power supply of the earpiece 4 and/or the transmitter unit 6 is nearing exhaustion, the earpiece 4 periodically emits an audible warning signal whose frequency increases, the nearer the power supply of either unit comes to being fully discharged.

Each time the transmitter unit 6 and earpiece 4 are fitted to the holder for charging, a new identification code is generated at random by the transmitter unit 6 and communicated to the earpiece 4, by which the earpiece 4 can then identify audio signals originating from that transmitter 6.

The earpiece 4 is also arranged, for example by pre-programming the earpiece or by programming the earpiece in-situ, to generate an audible output of received audio signals preceded by at least one other identification code, such as may be assigned to an infra-red transmitter installed in a public facility or retail outlet, the earpiece 4 preferably being arranged to give precedence to signals identified as having been received from the transmitter unit 6.

To facilitate the reception of audio signals from sources other than the transmitter unit 6, the infra-red receiver 10 of the earpiece 4 comprises a pair of photosensitive devices, one of which is directed downwards towards the transmitter unit 6, the other being directed upwards to receive signals from said other sources.

The transmitter unit 6 is also provided with an infrared receiver (not shown), adjacent the infra-red transmitter thereof, for adjusting the level of intensity of infra-red signals emitted from the unit, according to ambient light levels.

Figure 5:
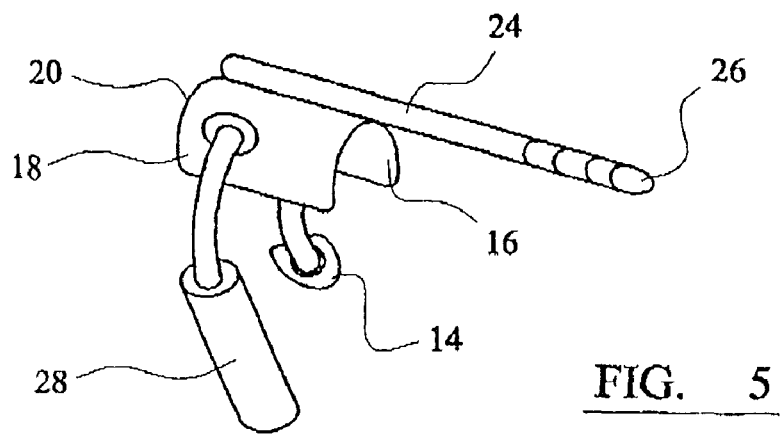
Figure 6:
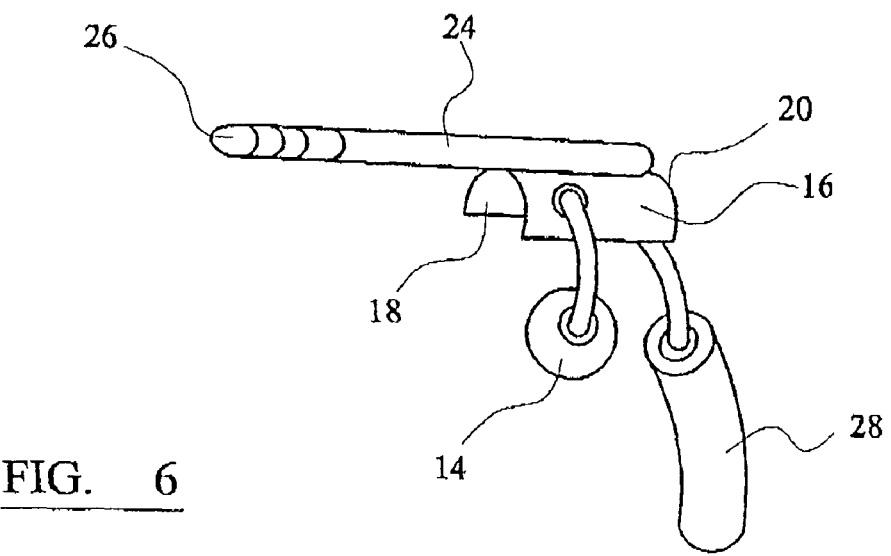

A first embodiment of earpiece 4 is shown in detail in FIGS. 4 to 6. Two part-cylindrical halves 16, 18 of a clip 20 are hingedly joined together along the top of the earpiece and are each lined with a cushioning material 22. A telescopic rod 24 extends forwards from the clip 20 and is provided at its distal end with an infra-red receiver 26. A portion of the rod, also at its distal end, is touch-sensitive for activating and de-activating the electronic circuitry of the earpiece. In its retracted position, the projecting portion of the rod 24 is arranged to fit either directly, or via an adaptor, into the cigarette lighter socket of a vehicle to recharge the power supply of the earpiece via electrical contacts on the exterior of the rod.

The distal end of the rod 24 may also be provided with a part-spherical mirrored portion (not shown), preferably comprising a plurality of concave parabolic facets, for reflecting a portion of the intra-red light emitted by the transmitter back towards an infra-red receiver located adjacent the transmitter.

Means are provided for varying the intensity of light emitted by the transmitter 6 according to the amount of light reflected to ensure that the amount of infra-red light falling upon the receiver 26 of the earpiece 4 remains substantially constant regardless of the orientation of the person, a head and thus the distance and/or misalignment between the transmitter 6 and the earpiece receiver 26.

The infra-red receiver located adjacent the transmitter 6 may also or otherwise be used to adjust the intensity of light emitted by the transmitter according to ambient light levels.

A speaker 14 and a housing 28 depend on opposite sides of the earpiece, from respective halves 16, 18 of the clip 20, the housing 28 accommodating the re-chargeable power supply and electronic circuitry of the earpiece 4.

Figure 7:
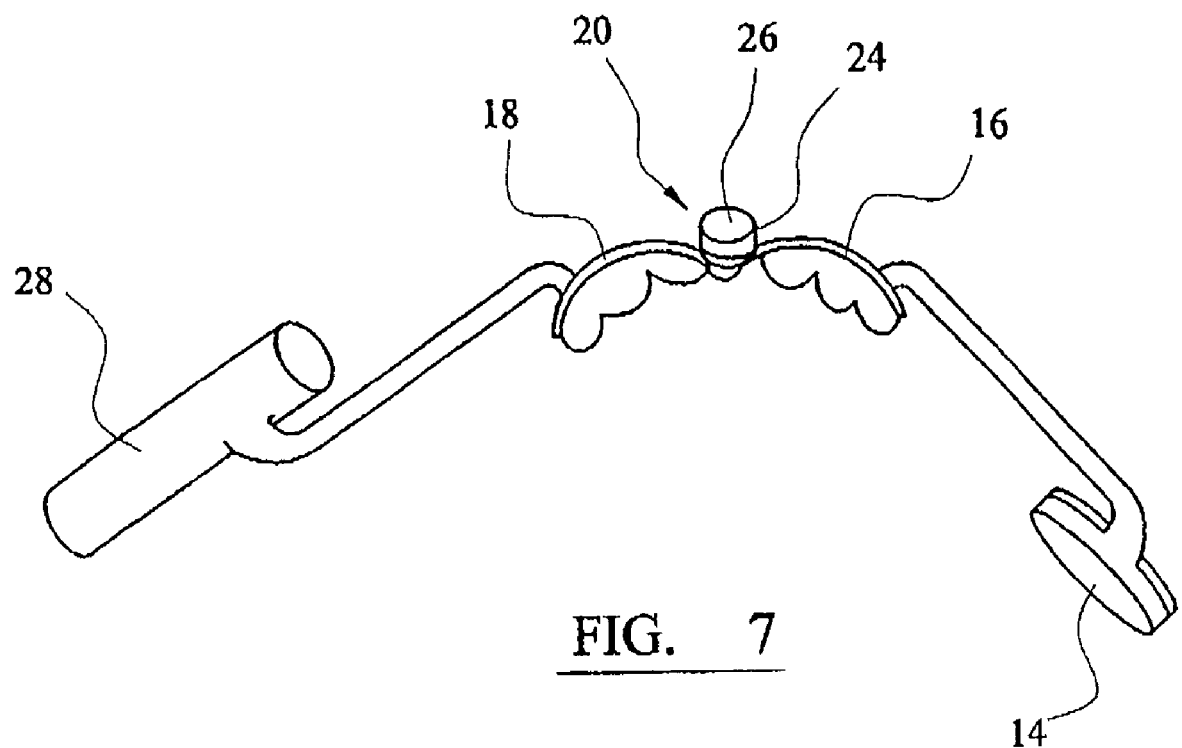
FIG. 7 is a front view showing the earpiece of FIGS. 4 to 6 opened for fitting to a person's ear.
Figure 8:
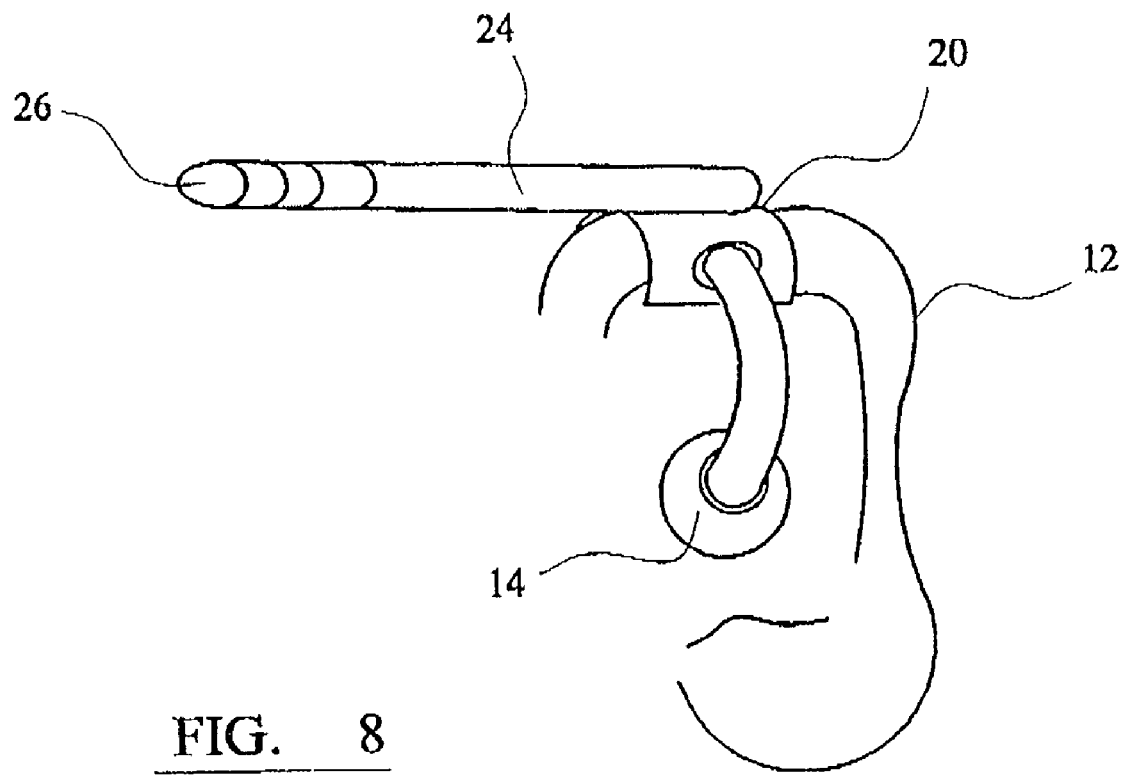
FIG. 8 is a side perspective view showing the earpiece of FIGS. 4 to 6 fitted to a person's ear.

The earpiece 4 is fitted to a person's ear 12 as shown in FIGS. 7 and 8 by first separating the speaker 14 and housing 28 parts of the earpiece to open the clip 20 and then bringing the two parts 14, 28 back together, on opposite sides of the person's ear 12 such that the clip 20 becomes attached to the top of the ear 12, with the speaker 14 positioned within the ear, the housing 28 extending behind the ear and the telescopic rod 24 extending forwards from the ear.

Figure 9:
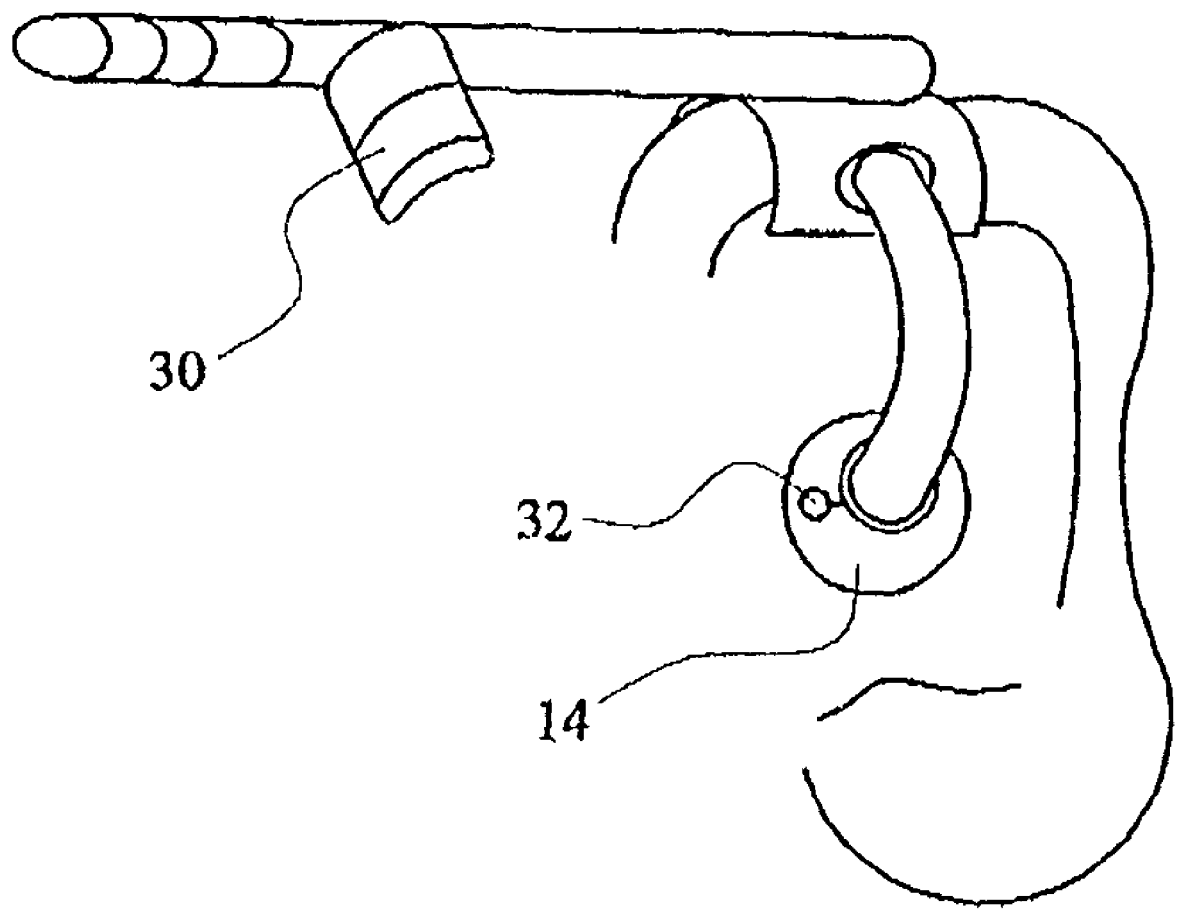
FIG. 9 is a side view of a second embodiment of earpiece in accordance with the present invention.

A second embodiment of earpiece 4 is shown in FIG. 9, and comprises a parabolic concave mirror 30 for reflecting signals from the transmitter to a receiver located adjacent the speaker 14.

Figure 10:
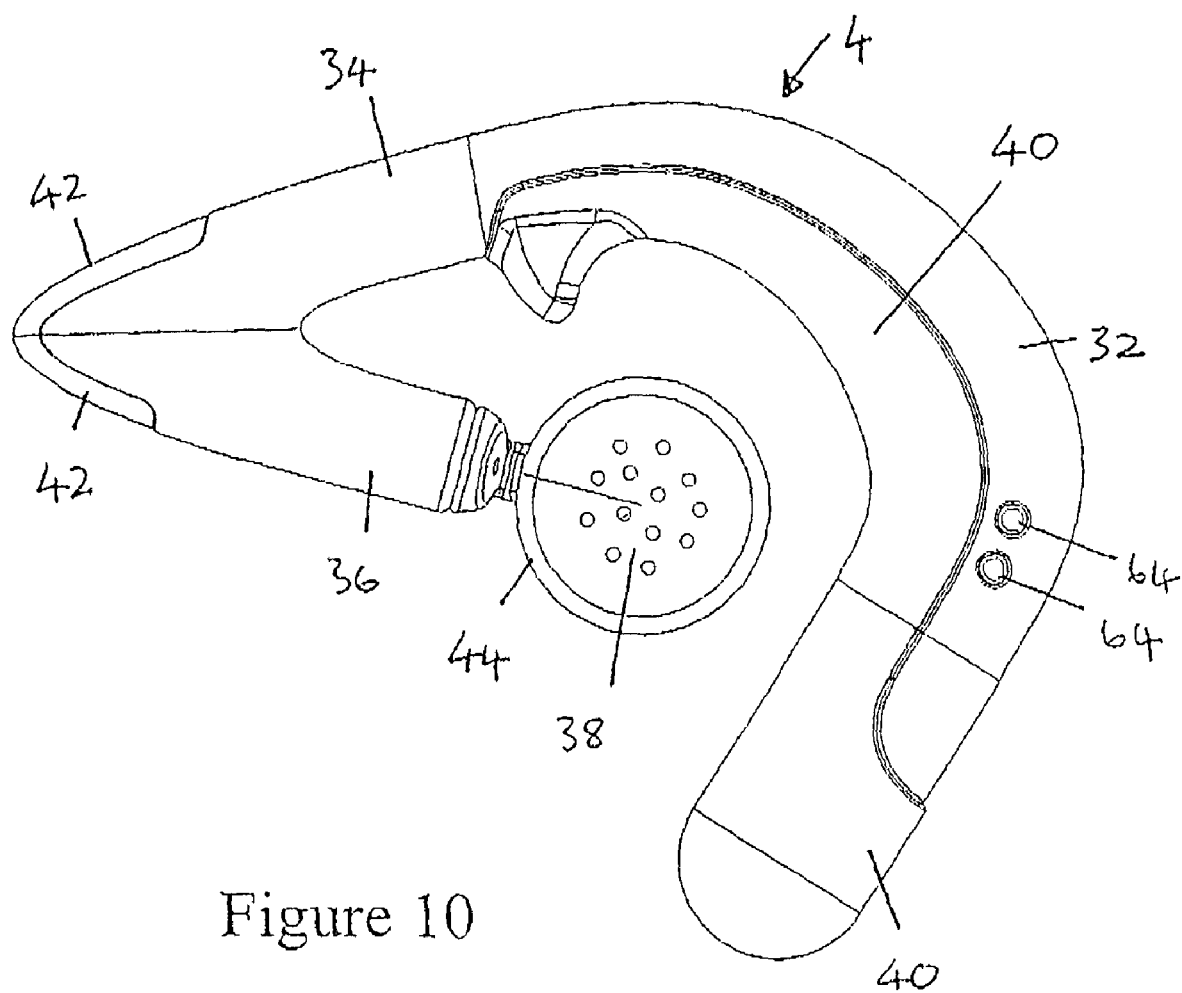
FIGS. 10 to 13 are respectively views from opposite sides and two perspective views of a third embodiment of earpiece in accordance with the present invention.
Figure 11:
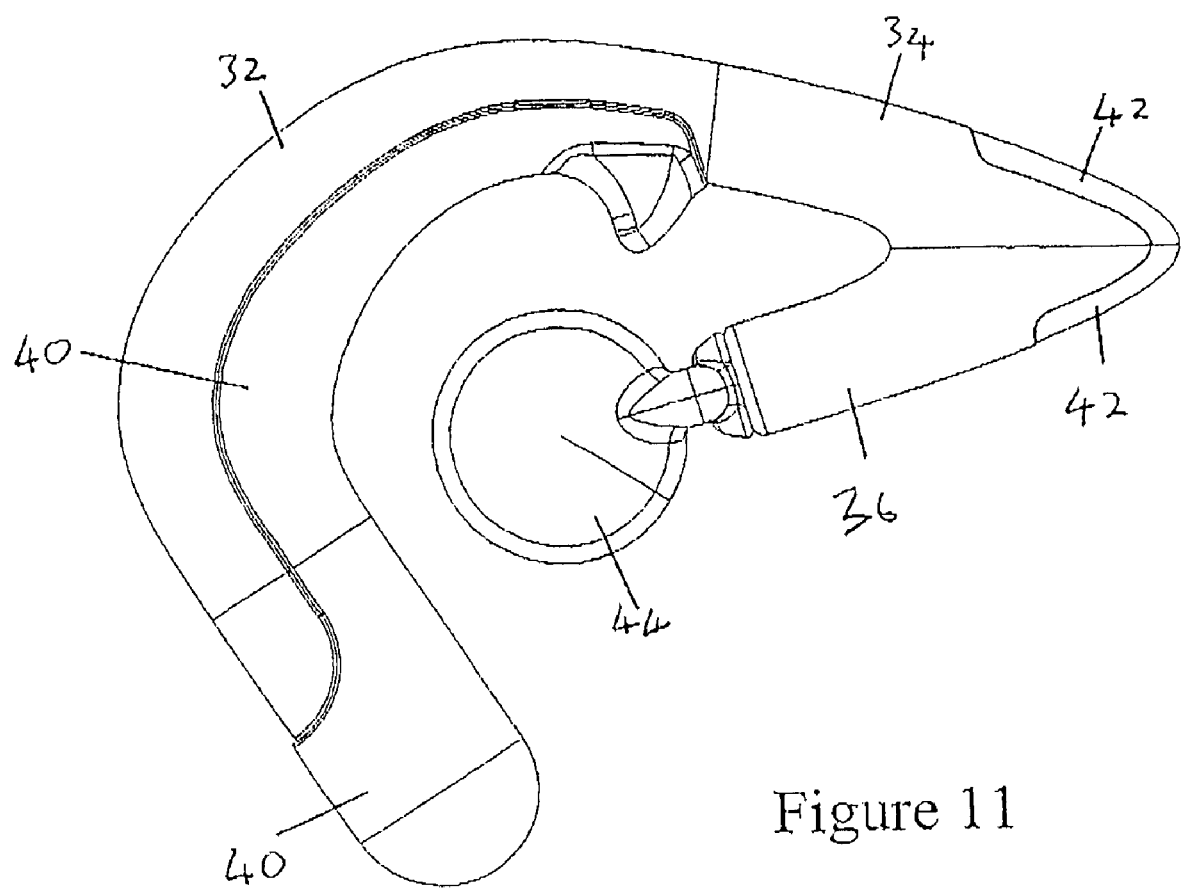
Figure 12:
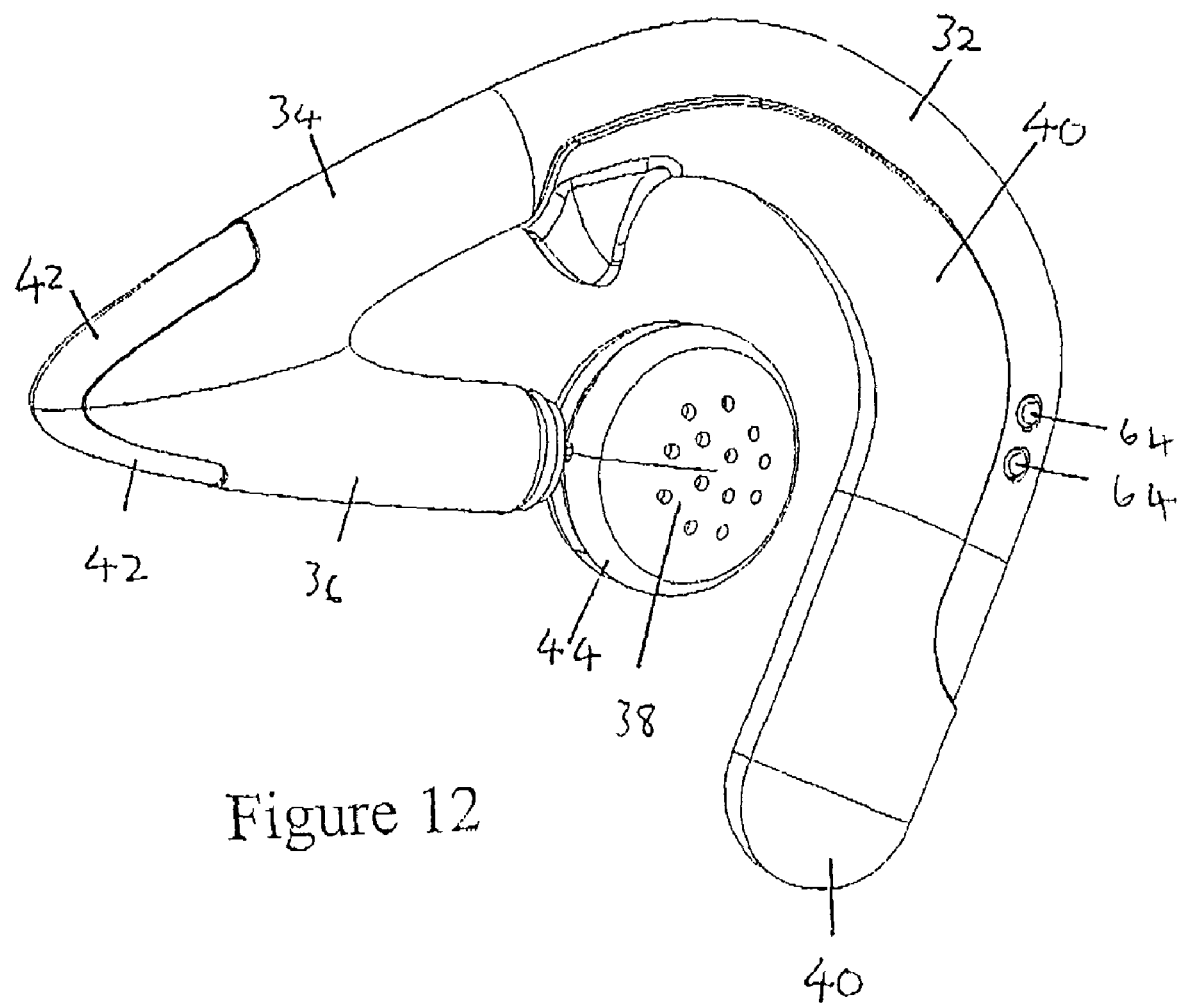
Figure 13:
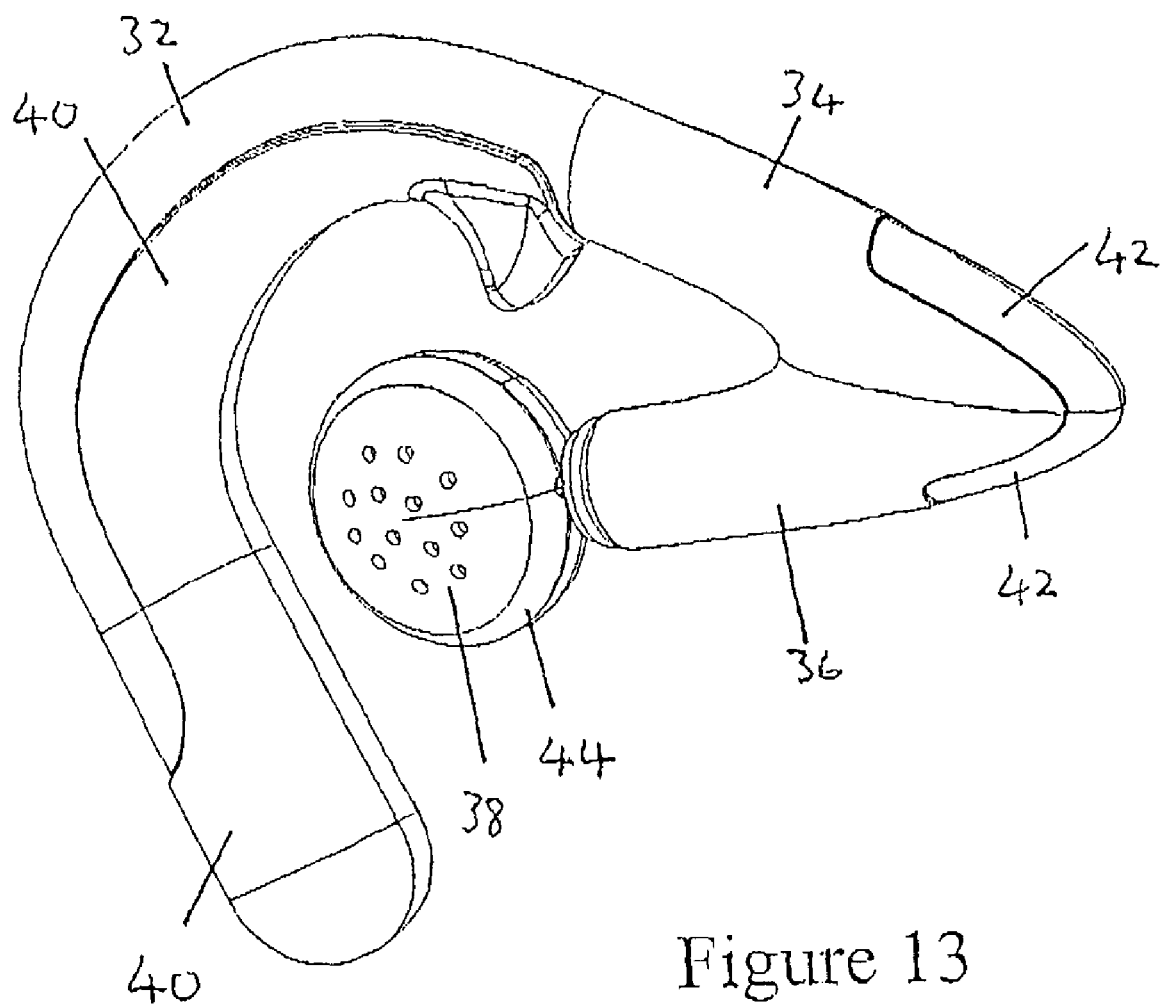

A third embodiment of earpiece 4 is shown in FIGS. 10 to 12 and, in an alternative configuration in FIG. 13, the earpiece comprising a tail portion 32 for hooking around the ear of the wearer, a portion 34 which, in use, extends forwards from the wearer's ear and a portion 36 which extends rearwards from the front of the device to support a microphone 38 over the external auditory canal of the wearer.

An elastomeric grip 40, fitted to the tail portion 32 of the earpiece is replaceable to allow the shape of the device to be readily modified to fit different sized and shaped ears and the device to be personalised to the wearer's taste by replacing the grip 40 with one of a different colour.

The front of the earpiece is provided with a window 42, behind which a pair of photosensitive devices are arranged to receive infra-red signals from above and below the earpiece respectively.

The tail portion 32 of the earpiece houses electronic circuitry and a rechargeable power supply.

The microphone 38 is rotatable about the axis of the rearwardly projecting portion 36, as illustrated in FIG. 13, to enable the earpiece to be configured for fitting either to the left or the right ear of the wearer.

Abutting parts of the portion 36 and a housing 44 of the microphone ensure that the microphone can only be rotated through 180 degrees between its left and right handed orientations.

Figure 14:
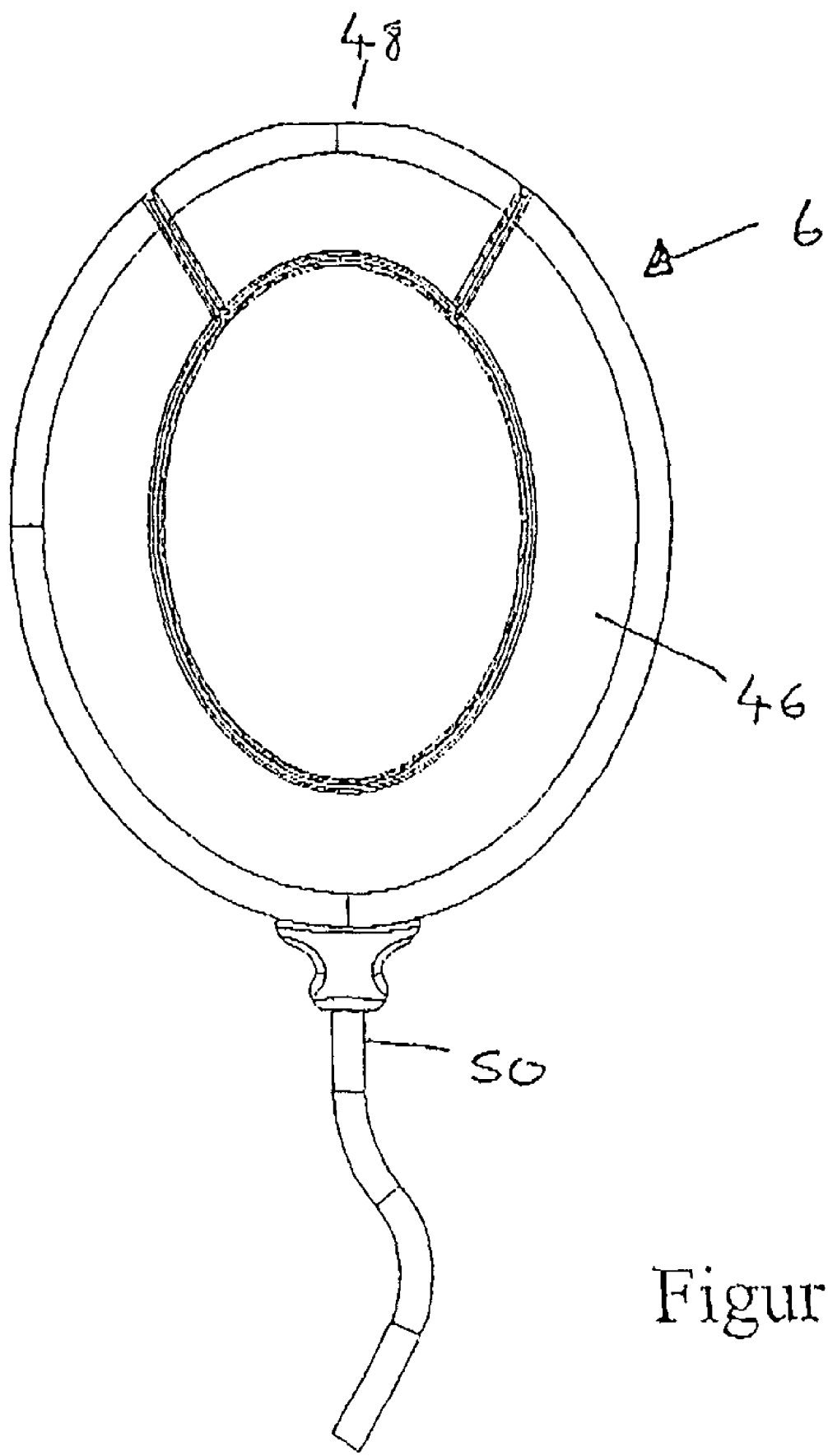
FIGS. 14 to 16 are respectively a front and rear views and a perspective view of an embodiment of transmitter unit in accordance with the present invention.
Figure 15:
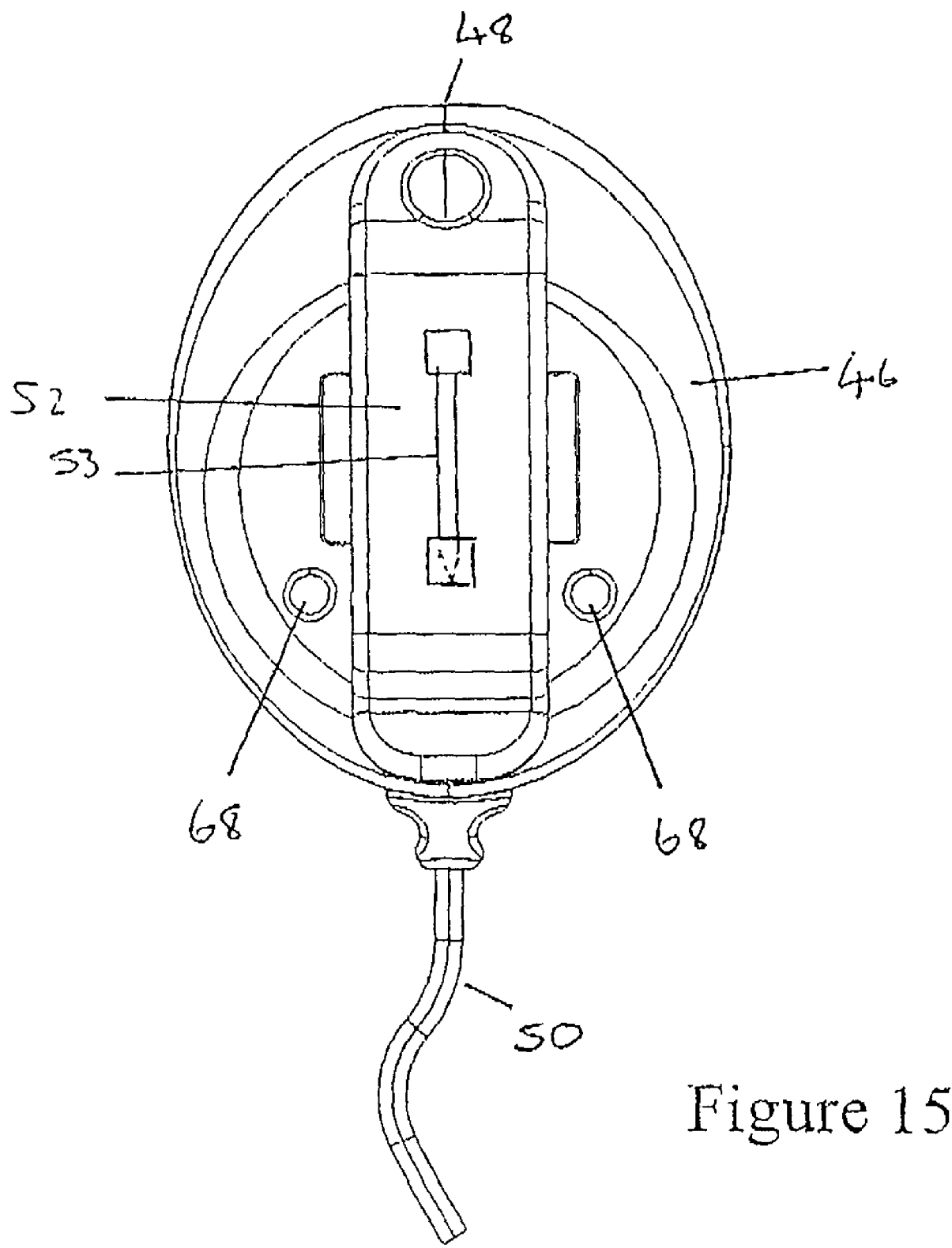
Figure 16:
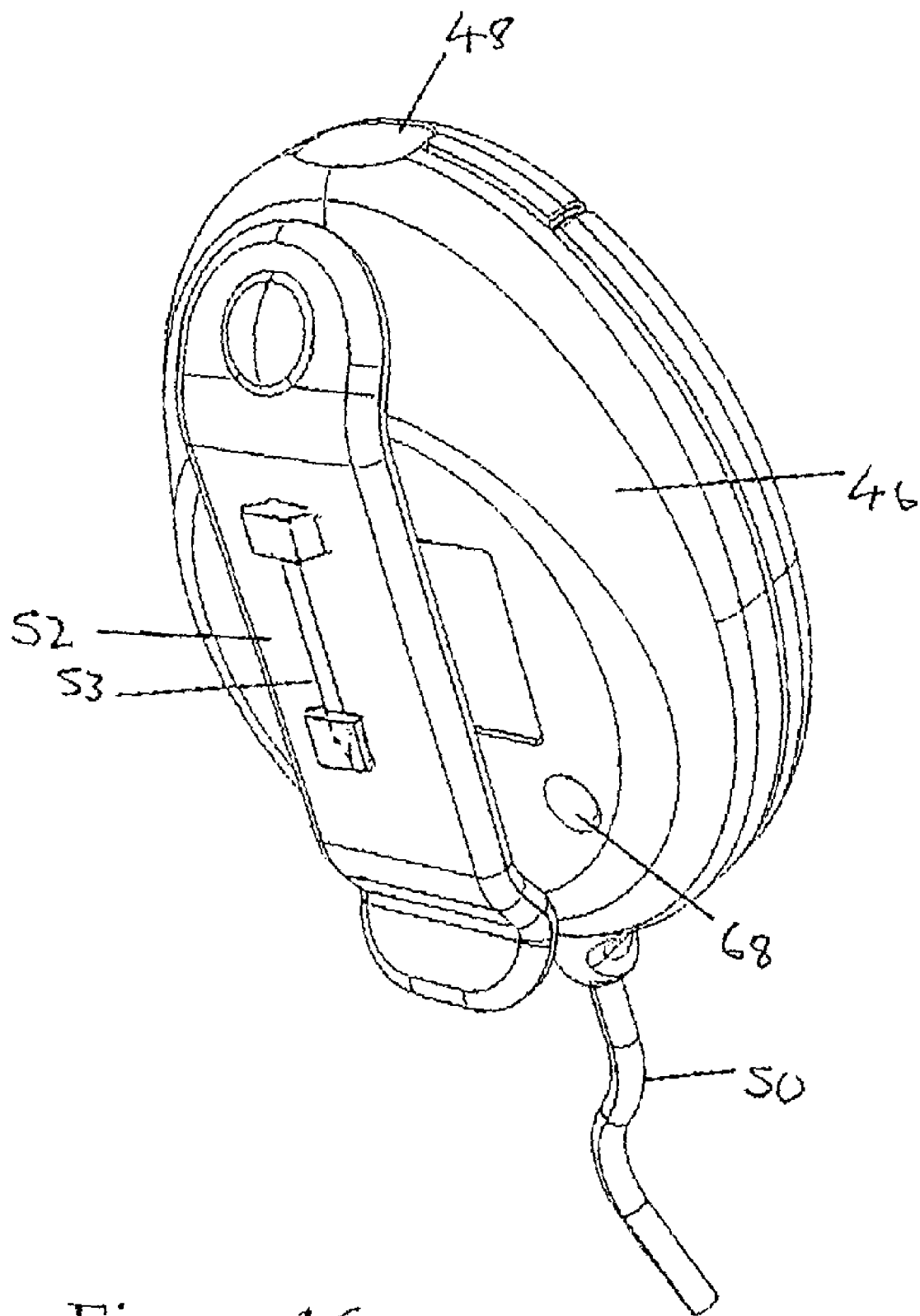
Figure 17:
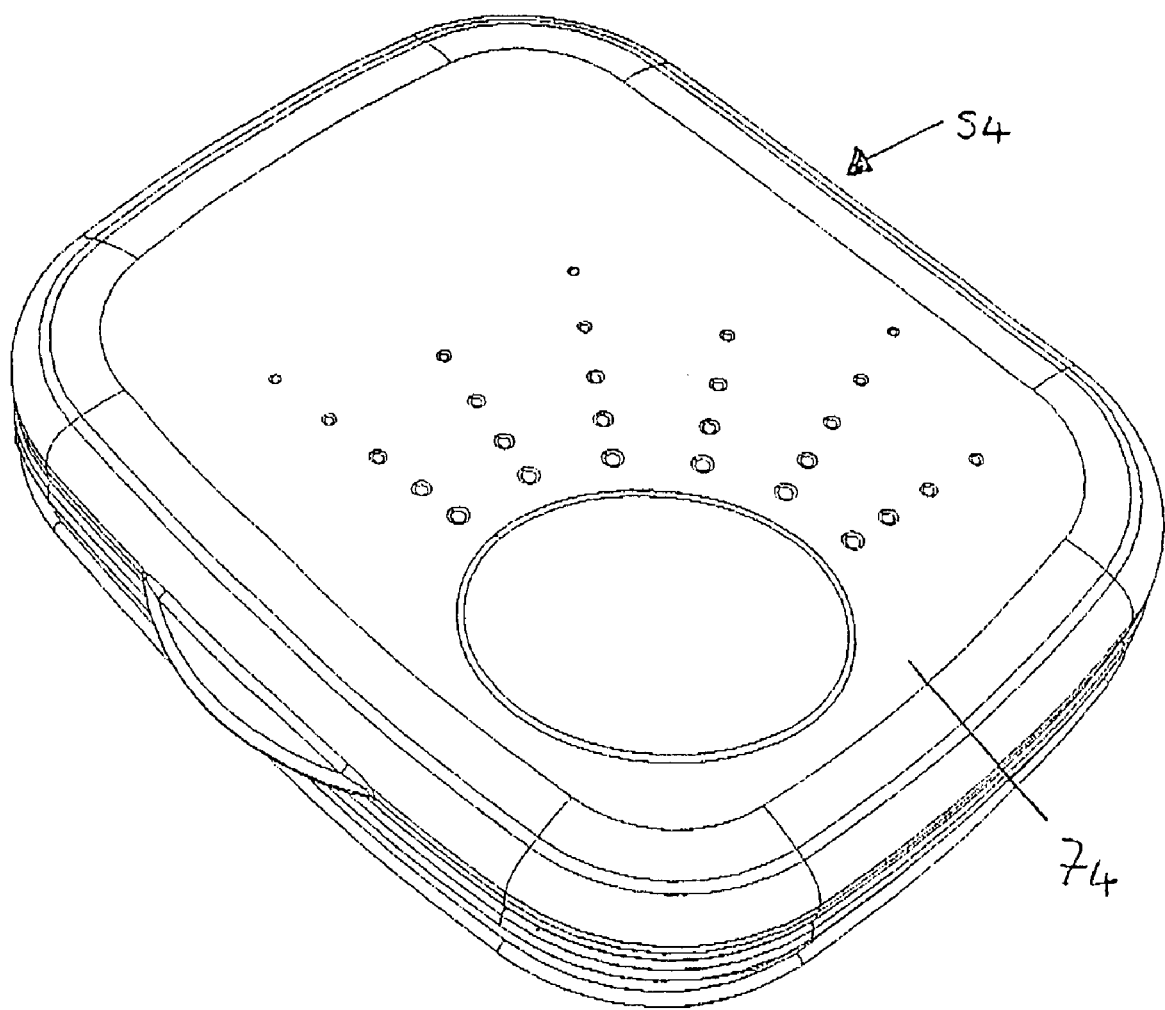
FIGS. 17 to 21 are respectively three perspective views, a view of the underside and a front view of an embodiment of holder in accordance with the present invention.
Figure 18:
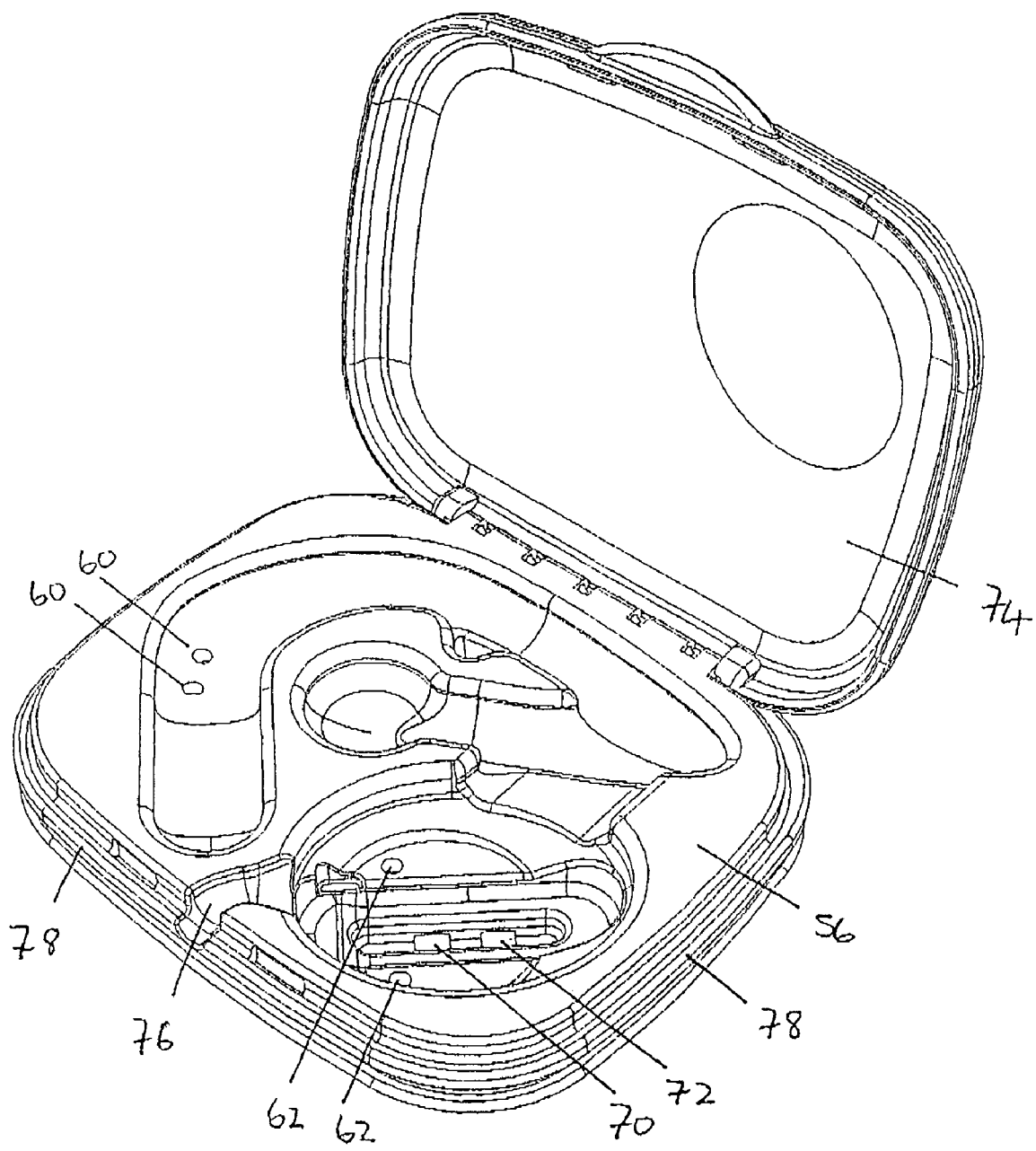

A preferred transmitter unit 6 is shown in FIGS. 14 to 16 and comprises a main body 46, within which electronic circuitry and a re-chargeable power supply are housed, the body part 46 being provided at opposite ends with an infra-red emitter 48 and a lead 50 for connecting the transmitter to a mobile radiotelephone handset.

A clip 52 having an integral metallic fastening pin 53 is provided at the rear of the body part 46, for respectively clipping or pinning the transmitter unit to an outer garment of user, the clip 52 being detachable from the body part to be replaced by an alternative fastening device if required.

Figure 19:
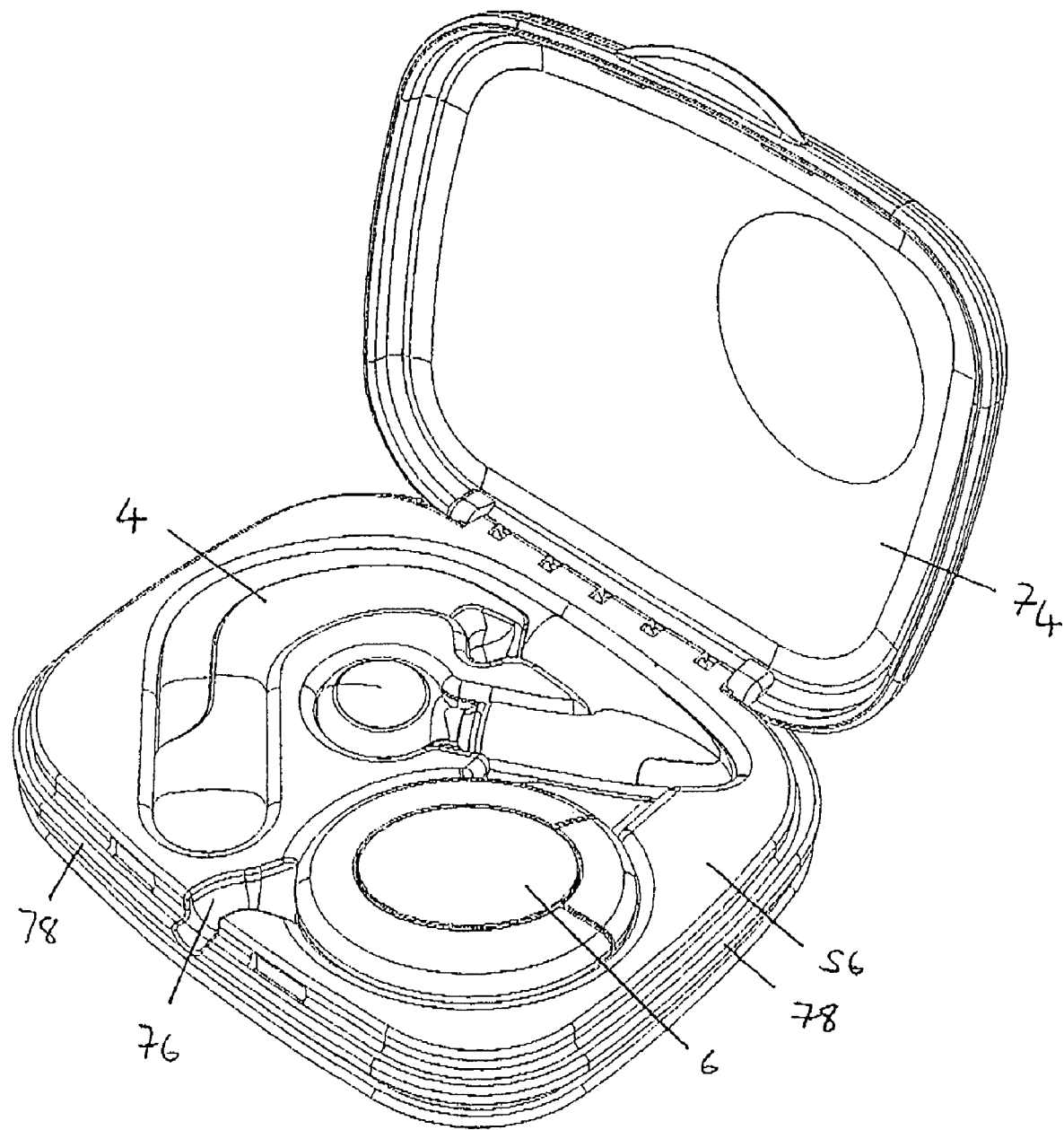
Figure 20:
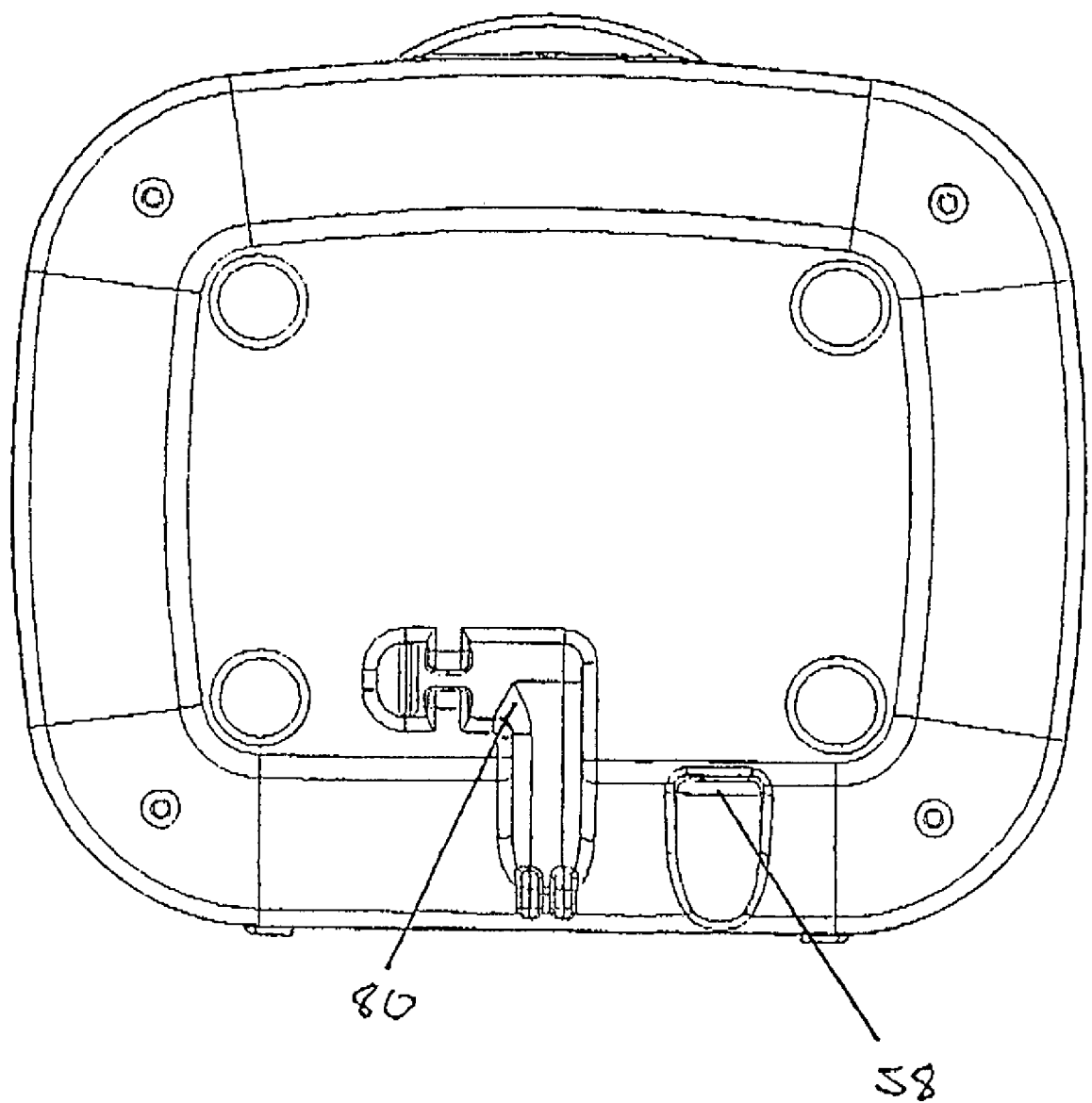
Figure 21:
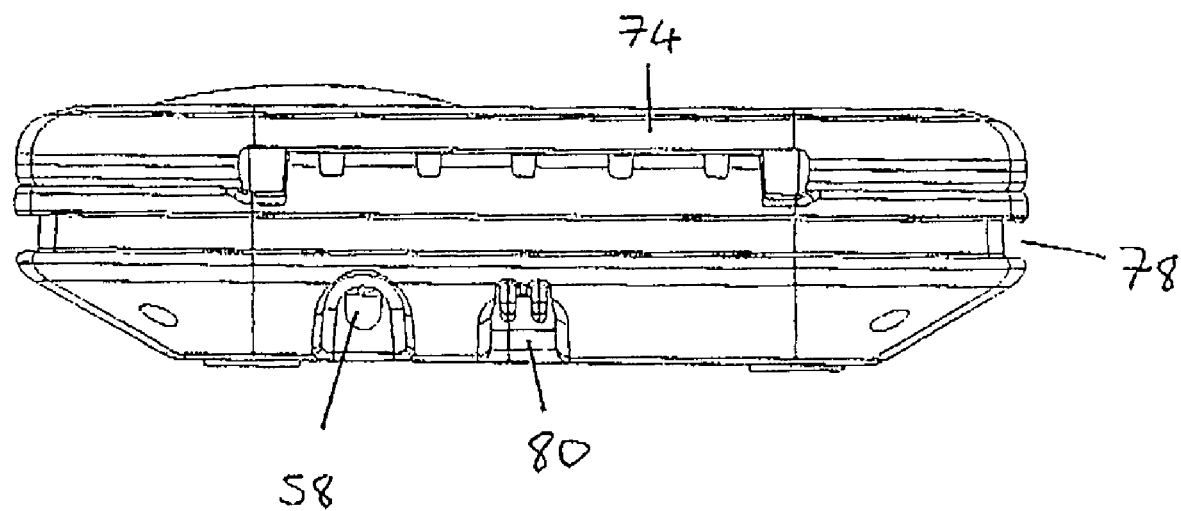

FIGS. 17 to 21 show a holder in the form of a case 54, having an internal tray 56 shaped to receive the earpiece and transmitter units of FIGS. 10 to 16, as shown in FIG. 19, for charging those devices either directly from an external power supply or via a rechargeable power source of the case.

The case 54 is provided with a socket 58 for connecting to said external power supply and two pairs of charging pins 60, 62 arranged to register with respective pairs of terminals 64, 68 formed in the bodies of the earpiece and transmitter units. A further pair of electrical contacts 70, 72 are arranged to be bridged by the fastening pin 53 of the transmitter unit 6, when that unit is fitted to the case, to complete a circuit for charging the earpiece 4.

The lid 74 of the case 54 is partially transparent, to provide a view of respective light emitting diodes (not shown) of the earpiece and transmitter units, which are illuminated whilst the devices are being charged. The same lights are preferably illuminated intermittently whilst the devices are operating (to provide an indication of whether the devices are charged), and are extinguished when their respective power supplies are exhausted.

An aperture 76 in the side of the case 54 provides a passageway through which the connecting lead 50 of the transmitter unit 6 may exit the case, to then be routed around a channel 78 formed in the sides of the case and secured in place by locating a connector at the end of the lead within a correspondingly shaped recess 80 formed in the base of the case.

The wireless, hands-free arrangements thus described provide a much safer and more convenient alternative to existing hand-free arrangements for use with mobile radio-telephone handsets.

The invention claimed is:

1. A hands-free kit for a mobile radio-telephone handset, said hands-free kit comprising:

an earpiece for a user, said earpiece having an infra-red receiver;

a transmitter comprising means for directly relaying audio signals from the mobile radio-telephone handset to said earpiece when said earpiece is worn by the user, said infra-red receiver of said earpiece receiving said audio signals from said transmitter when said transmitter is also being worn or carried by, or attached to, the user; and, means for attaching, carrying or wearing said transmitter by the user on a front side of the user's body and in a line of sight of said earpiece for direct transmission from said transmitter worn or carried by, or attached to, the user to said infra-red receiver of said earpiece, or for direct transmission from said transmitter to a forwards projecting portion of said earpiece having means for reflecting audio signals from, at least, a direction of said transmitter towards said infra-red receiver, wherein the means for reflecting audio signals includes a parabolic concave mirror, said hands-free kit for the mobile-telephone handset being operable when said earpiece, said transmitter and said means for attaching, carrying or wearing said transmitter are all located exclusively on the user's body.

2. The hands-free kit for a mobile radio-telephone handset according to claim 1, wherein said infra-red receiver comprises a plurality of photosensitive devices for receiving infra-red signals from different directions, including a direction leading from said transmitter.

3. The hands-free kit for a mobile radio-telephone handset according to claim 1, wherein said transmitter communicates with the mobile-radio-telephone handset via a wireless connection.

4. The hands-free kit for a mobile radio-telephone handset according to claim 1, wherein said receiver is located at a distal end of a portion of said earpiece with said receiver projecting forward from an ear of the user.

5. The hands-free kit for a mobile radio-telephone handset according to claim 1, further comprising a microphone and means for connecting said microphone to the mobile radio-telephone handset.

6. The hands-free kit for a mobile radio-telephone handset according to claim 5, wherein said microphone comprises a part of an integrated unit also comprising a transmitter.

7. The hands-free kit for a mobile radio-telephone handset according to claim 5, wherein said transmitter communicates with the mobile radio-telephone handset via a wireless connection, and said microphone and said transmitter each communicate with the mobile radio-telephone handset via the same said wireless connection.

8. The hands-free kit for a mobile radio-telephone handset according to claim 1, wherein said transmitter comprises a rechargeable power Supply.

9. The hands-free kit for a mobile radio-telephone handset according to claim 1, wherein said earpiece comprises a rechargeable power supply.

10. The hands-free kit for a mobile radio-telephone handset according to claim 1, wherein said transmitter and said earpiece each have a rechargeable power supply.

11. The hands-free kit for a mobile radio-telephone handset according to claim 10, further comprising a holder for said earpiece and said transmitter by which said rechargeable power supply for each of said earpiece and said transmitter are able to be charged.

12. The hands-free kit for a mobile radio-telephone handset according to claim 11, wherein said holder comprises means for charging said earpiece and said transmitter directly from an external power supply.

13. The hands-free kit for a mobile radio-telephone handset according to claim 11, wherein said holder comprises a rechargeable power supply and means for charging said earpiece and said transmitter via said rechargeable power supply of said holder.

14. The hands-free kit for a mobile radio-telephone handset according to claim 11, wherein said holder includes means for preventing said earpiece from being charged independently of said transmitter.

15. The hands-free kit for a mobile radio-telephone handset according to claim 11, wherein said holder includes means for preventing said earpiece from being charged independently of said earpiece.

16. The hands-free kit for a mobile radio-telephone handset according to claim 11, wherein said holder includes means for visibly indicating a state of charge for said holder.

17. The hands-free kit for a mobile radio-telephone handset according to claim 11, wherein said holder includes means for visibly indicating a state of charge for at least one of said transmitter and said earpiece.

18. The hands-free kit for a mobile radio-telephone handset according to claim 17, wherein said means for visibly indicating a state of charge includes a light.

19. The hands-free kit for a mobile radio-telephone handset according to claim 18, wherein said light is constantly illuminated, extinguished or illuminated intermittently for indicating different states of charge.

20. The hands-free kit for a mobile radio-telephone handset according to claim 8, wherein said transmitter includes means for visibly indicating a state of charge.

21. The hands-free kit for a mobile radio-telephone handset according to claim 20, wherein said means for visibly indicating a state of charge includes a light.

22. The hands-free kit for a mobile radio-telephone handset according to claim 21, wherein said light is constantly illuminated, extinguished or illuminated intermittently for indicating different states of charge.

23. The hands-free kit for a mobile radio-telephone handset according to claim 20, further comprising a holder for said transmitter by which said rechargeable power supply for said transmitter is able to be charged, said holder comprising a lidded case having a portion of which is at least partially transparent and through which said means for visibly indicating a state of charge for said transmitter is able to be viewed.

24. The hands-free kit for a mobile radio-telephone handset according to claim 9, wherein said earpiece includes means for visibly indicating a state of charge.

25. The hands-free kit for a mobile radio-telephone handset according to claim 24, wherein said means for visibly indicating a state of charge includes a light.

26. The hands-free kit for a mobile radio-telephone handset according to claim 25, wherein said light is constantly illuminated, extinguished or illuminated intermittently for indicating different states of charge.

27. The hands-free kit for a mobile radio-telephone handset according to claim 24, further comprising a holder for said earpiece by which said rechargeable power supply for said earpiece is able to be charged, said holder comprising a lidded case having a portion of which is at least partially transparent and through which said means for visibly indicating a state of charge for said earpiece is able to be viewed.

28. The hands-free kit for a mobile radio-telephone handset according to claim 9, wherein said earpiece emits an audible warning signal for indicating where a power supply of at least one of said transmitter and said earpiece is nearing exhaustion.

29. The hands-free kit for a mobile radio-telephone handset according to claim 28, wherein said audible warning signal comprises a periodic signal that increases in frequency as said power supply of at least one of said earpiece and said transmitter is exhausted.

30. The hands-free kit for a mobile radio-telephone handset according to claim 1, wherein said audio signals transmitted from said transmitter to said infix-red receiver are encrypted.

31. The hands-free kit for a mobile radio-telephone handset according to claim 1, wherein said transmitter transmits an identification signal for identifying said transmitter to said earpiece.

32. The hands-free kit for a mobile radio-telephone handset according to claim 31, wherein said identification signal is a unique signal.

33. The hands-free kit for a mobile radio-telephone handset according to claim 31, wherein said identification signal is chosen on a random basis from one of a plurality of possible identification signals.

34. The hands-free kit for a mobile radio-telephone handset according to claim 31, wherein said transmitter and said infra-red receiver are pre-programmed for operating a particular said identification signal.

35. The hands-free kit for a mobile radio-telephone handset according to claim 31, wherein said identification signal is communicated from said transmitter to said infra-red receiver.

36. The hands-he kit for a mobile radio-telephone handset according to claim 35, wherein said identification signal is generated by said transmitter.

37. The hands-free kit for a mobile radio-telephone handset according to claim 36, wherein said identification signal is derived from an identification code of the mobile radio-telephone handset with which said hands-free kit is to be used.

38. The hands-free kit for a mobile radio-telephone handset according to claim 37, wherein said identification code is a telephone number.

39. The hands-free kit for a mobile radio-telephone handset according to claim 36, wherein said identification signal is chosen on a random basis.

40. The hands-free kit for a mobile radio-telephone handset according to claim 39, wherein a new identification signal, chosen on a random basis, is communicated to said earpiece on a periodic basis.

41. The hands-free kit for a mobile radio-telephone handset according to claim 31, wherein said earpiece responds to an invalid said identification signal by emitting an audible warning signal.

42. The hands-free kit for a mobile radio-telephone handset according to claim 31, wherein said transmitter periodically transmits said identification signal within a stream of said audio signals.

43. The hands-free kit for a mobile radio-telephone handset according to claim 42, wherein said earpiece provides an audible alarm signal if a valid said identification signal is not received within a predetermined period of time.

44. The hands-free kit for a mobile radio-telephone handset according to claim 1, wherein said earpiece operates for periods in a standby mode with at least one function of said earpiece is disabled for conserving electrical power.

45. The hands-free kit for a mobile radio-telephone handset according to claim 44, wherein said earpiece enters said standby mode when a received audio signal is absent.

46. The hands-free kit for a mobile radio-telephone handset according to claim 44, wherein said transmitter transmits an identification signal for identifying said transmitter to said earpiece with said earpiece entering said standby if a valid said identification signal is not received.

47. The hands-free kit for a mobile radio-telephone handset according to claim 44, wherein said at least one function having been disabled is restored in response to a received audio signal.

48. The hands-free kit for a mobile radio-telephone handset according to claim 47, wherein said at least one function having been disabled is only restored if said received audio signal comprises a valid said identification signal.

49. The hands-free kit for a mobile radio-telephone handset according to claim 44, wherein entry into said standby mode is immediate.

50. The hands-free kit for a mobile radio-telephone handset according to claim 44, wherein entry into said standby mode is delayed.

51. The hands-free kit for a mobile radio-telephone handset according to claim 1, wherein said transmitter operates for periods in a standby mode with at least one function of said transmitter being disabled for conserving electrical power in an absence of said audio signals from the mobile radio-telephone handset.

52. The hands-free kit for a mobile radio-telephone handset according to claim 1, further comprising:
an additional infra-red receiver positioned adjacent said transmitter; and,
means for varying intensity of infra-red light emitted by said transmitter according to an amount of infra-red light received by said additional infra-red receiver.

53. The hands-free kit for a mobile radio-telephone handset according to claim 1, wherein said hands-free kit includes a set-up mode in which said transmitter emits a light signal of substantially constant amplitude and said earpiece emits a periodic audible signal having a periodicity varying according to an amount of light received from said transmitter as positioning of said transmitter is adjusted by a user.

54. The hands-free kit for a mobile radio-telephone handset according to claim 1, wherein said means for attaching, carrying or wearing said transmitter by the user in a line of sight of said earpiece is capable of being worn by the user at the user's breast.

55. A method for using a hands-free kit for a mobile radio-telephone handset, said hands-free kit comprising:
an earpiece for a user, said earpiece having an infra-red receiver;
a transmitter comprising means for relaying audio signals from the mobile radio-telephone handset to said earpiece, said infra-red receiver of said earpiece receiving said audio signals; and,
means for attaching, carrying or wearing said transmitter by the user on a front side of the user's body and in a line of sight of said earpiece,
said method for comprising the steps of:
wearing said earpiece by the user;
carrying or wearing said transmitter by the user on the front side of the user's body and in said line of sight of said earpiece;
directly transmitting the audio signals from said transmitter, when said transmitter is worn or carried by, or attached to, the user, and in a line of sight of said infra-red receiver, to said infra-red receiver of said earpiece worn by the user, or directly transmitting the audio signals from said transmitter to a forwards projecting portion of said earpiece having means for reflecting audio signals from, at least, a direction of said transmitter towards said infra-red receiver, wherein the means for reflecting audio signals includes a parabolic concave mirror; and
operating said hands-free kit for the mobile-telephone handset by the user when said earpiece, said transmitter and said means for attaching, carrying or wearing said transmitter are all located exclusively on the user's body.

56. The method for using a hands-free kit for a mobile radio-telephone handset according to claim 55, wherein said step of carrying or wearing said transmitter by the user in said line of sight of said earpiece is carried out by the user wearing said transmitter at the user's breast.

57. A hands-free kit for a mobile radio-telephone handset, said hands-free kit comprising:
an earpiece for a user, said earpiece having an infra-red receiver;
a transmitter comprising means for directly relaying audio signals from the mobile radio-telephone handset to said earpiece when said earpiece is worn by the user, said transmitter further including means for encoding said audio signals using at least one encryption algorithm, said infra-red receiver of said earpiece receiving said audio signals from said transmitter when said transmitter is also being worn or carried by, or attached to, the user, said infra-red receiver including means for decoding said audio signals so encoded by said transmitter; and, means for attaching, carrying or wearing said transmitter by the user on a front side of the user's body and in a line of sight of said earpiece for direct transmission from said transmitter worn or carried by, or attached to, the user to said earpiece, or for direct transmission to a forwards projecting portion of said earpiece, the forward, projecting portion having a parabolic concave mirror for reflecting audio signals from, at least, a direction of said transmitter towards said infrared receiver, said hands-free kit for the mobile-telephone handset being operable when said earpiece, said transmitter and said means for attaching, carrying or wearing said transmitter are all located exclusively on the user's body.

58. The hands-free kit for a mobile radio-telephone handset according to claim 57, wherein said means for encoding said audio signals and means for decoding said audio signals use one of a plurality of encryption algorithms chosen on a random basis.

59. The hands-free kit for a mobile radio-telephone handset according to claim 57, wherein said transmitter and said infra-red receiver are pre-programmed with an encryption key.

60. The hands-free kit for a mobile radio-telephone handset according to claim 59, wherein said encryption key is transmitted from said transmitter to said infra-red receiver.

61. The hands-free kit for a mobile radio-telephone handset according to claim 60, wherein said encryption key is generated by said transmitter.

62. The hands-free kit for a mobile radio-telephone handset according to claim 61, wherein said encryption key is derived from an identification code of said hands-free kit being used.

63. The hands-free kit for a mobile radio-telephone handset according to claim 62, wherein said identification code is a telephone number.

64. The hands-free kit for a mobile radio-telephone handset according to claim 62, wherein said encryption key is chosen on a random basis.

65. The hands-free kit for a mobile radio-telephone handset according to claim 64, wherein a new encryption key, chosen on a random basis, is transmitted to said infra-red receiver on a periodic basis.

* * * * *